US008966690B2

(12) United States Patent
Stokes et al.

(10) Patent No.: US 8,966,690 B2
(45) Date of Patent: Mar. 3, 2015

(54) MULTI-TOOL APPARATUS

(71) Applicants: Thomas R. Stokes, Williamsburg, VA (US); Launce R. Barber, Bradenton, FL (US)

(72) Inventors: Thomas R. Stokes, Williamsburg, VA (US); Launce R. Barber, Bradenton, FL (US)

(73) Assignee: Elemental Tools, LLC, Richmond, VA (US)

( * ) Notice: Subject to any disclaimer, the term of this patent is extended or adjusted under 35 U.S.C. 154(b) by 236 days.

(21) Appl. No.: 13/625,396

(22) Filed: Sep. 24, 2012

(65) Prior Publication Data

US 2014/0082850 A1 Mar. 27, 2014

(51) Int. Cl.
  *B25F 1/04* (2006.01)
  *H02G 1/00* (2006.01)
  *B25B 7/00* (2006.01)

(52) U.S. Cl.
  USPC .......................... 7/108; 7/129; 7/158; 30/153

(58) Field of Classification Search
  USPC ..................... 7/107, 125, 127–129, 132, 158; 30/91.2, 153, 155
  See application file for complete search history.

(56) References Cited

U.S. PATENT DOCUMENTS

| 3,151,510 | A | * | 10/1964 | Bunker et al. | 30/90.6 |
| 4,512,051 | A | * | 4/1985 | Magan | 7/128 |
| 5,038,644 | A | | 8/1991 | Delsack | |
| 5,435,029 | A | * | 7/1995 | Carlson et al. | 7/107 |
| 5,809,600 | A | * | 9/1998 | Cachot | 7/128 |
| 5,916,277 | A | * | 6/1999 | Dallas | 7/128 |
| 6,101,654 | A | * | 8/2000 | Cachot | 7/128 |
| 6,223,372 | B1 | | 5/2001 | Barber | |
| 6,314,600 | B1 | * | 11/2001 | Cachot | 7/128 |
| 6,351,865 | B1 | * | 3/2002 | De Donato | 7/107 |
| 6,412,130 | B1 | * | 7/2002 | Kershaw et al. | 7/129 |
| 6,460,433 | B1 | * | 10/2002 | Ackeret et al. | 81/440 |
| 6,470,522 | B2 | * | 10/2002 | Veltz et al. | 7/128 |
| D484,770 | S | | 1/2004 | Green | |
| 7,000,323 | B1 | | 2/2006 | Hatcher et al. | |
| 7,126,484 | B1 | * | 10/2006 | Luquire | 340/574 |
| 7,676,931 | B2 | * | 3/2010 | Knight et al. | 30/158 |
| 8,087,115 | B2 | | 1/2012 | Barber et al. | |
| 8,176,814 | B1 | | 5/2012 | Bernstein et al. | |
| 2008/0271255 | A1 | * | 11/2008 | Frazer | 7/107 |

* cited by examiner

*Primary Examiner* — David B Thomas
(74) *Attorney, Agent, or Firm* — Brian J. Teague

(57) ABSTRACT

A multi-tool apparatus includes a frame having at least one opening and at least one gate element partially bounding the at least one opening. The at least one gate element is movable relative to the frame to permit access to the opening. The apparatus includes at least one cutting element partially bounding the at least one opening. The at least one gate element is movable into the opening so that the at least one gate element and at least one cutting element come into contact for wire stripping, crimping, and cutting operations.

24 Claims, 16 Drawing Sheets

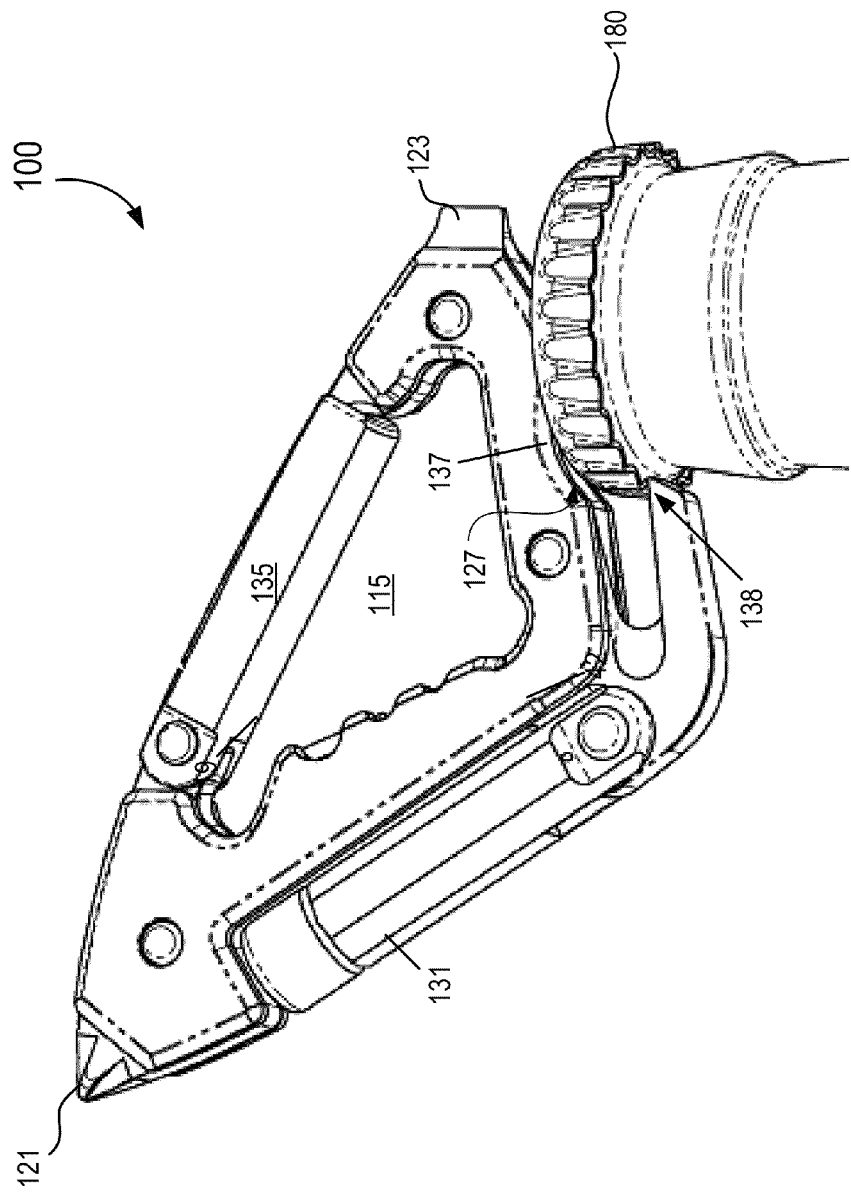

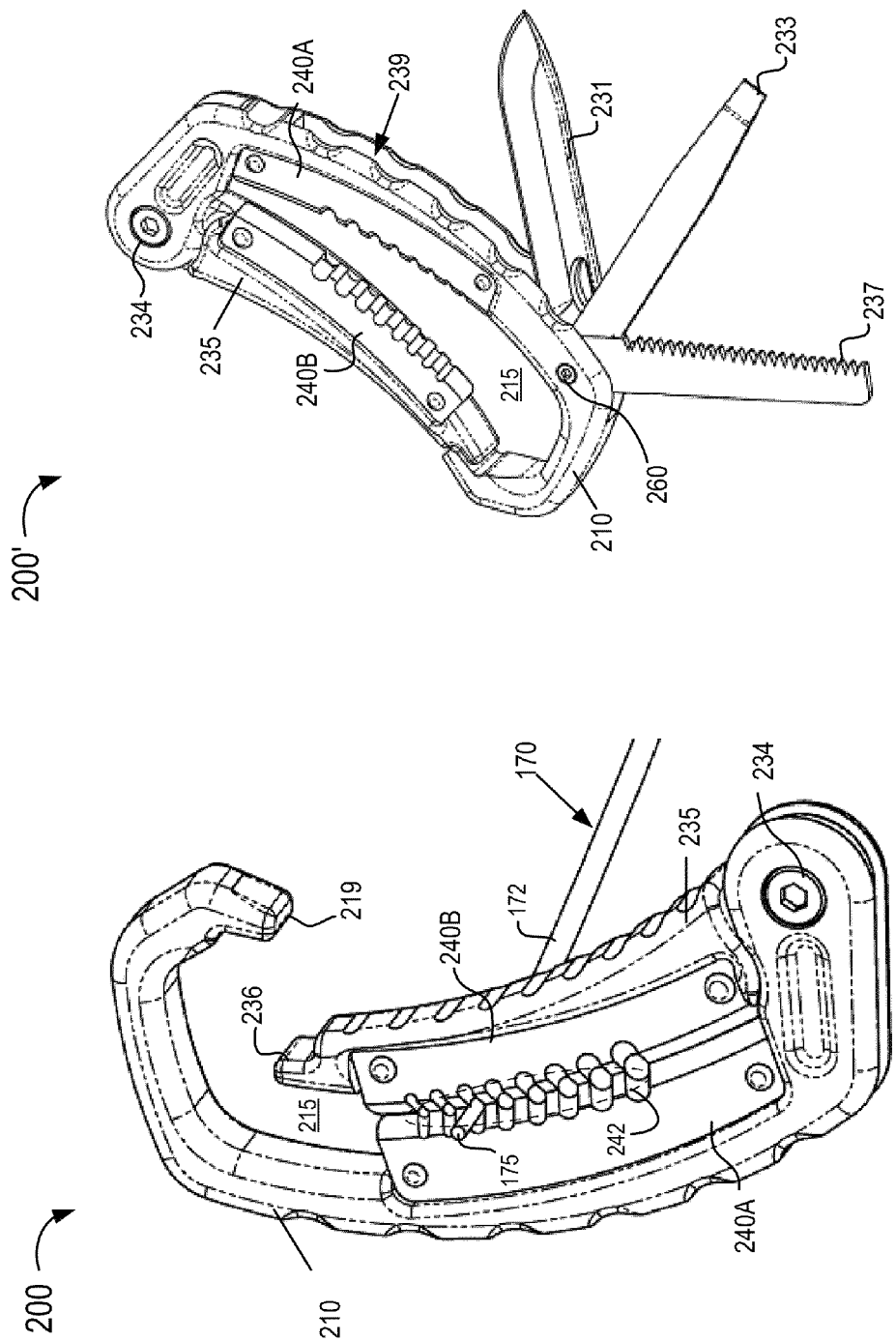

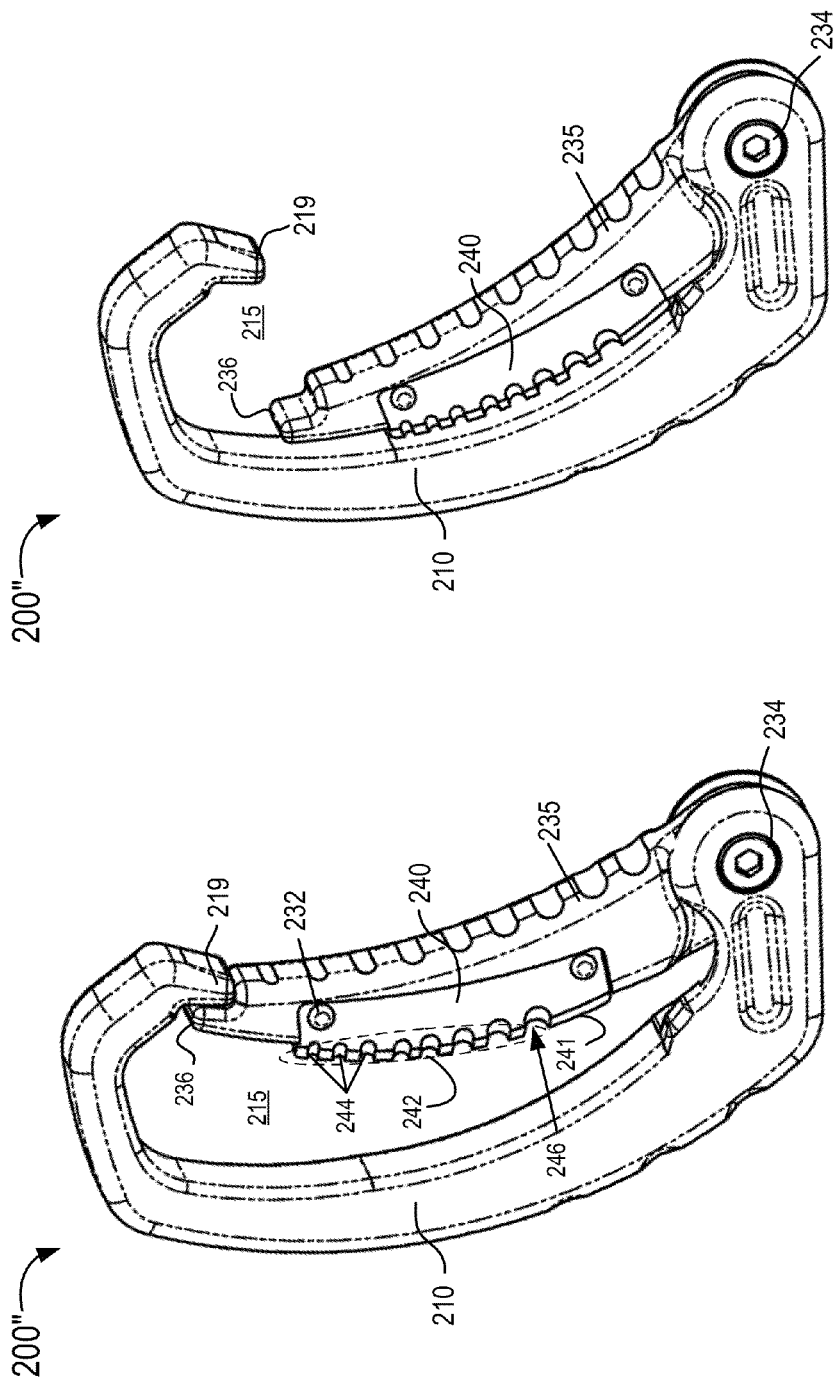

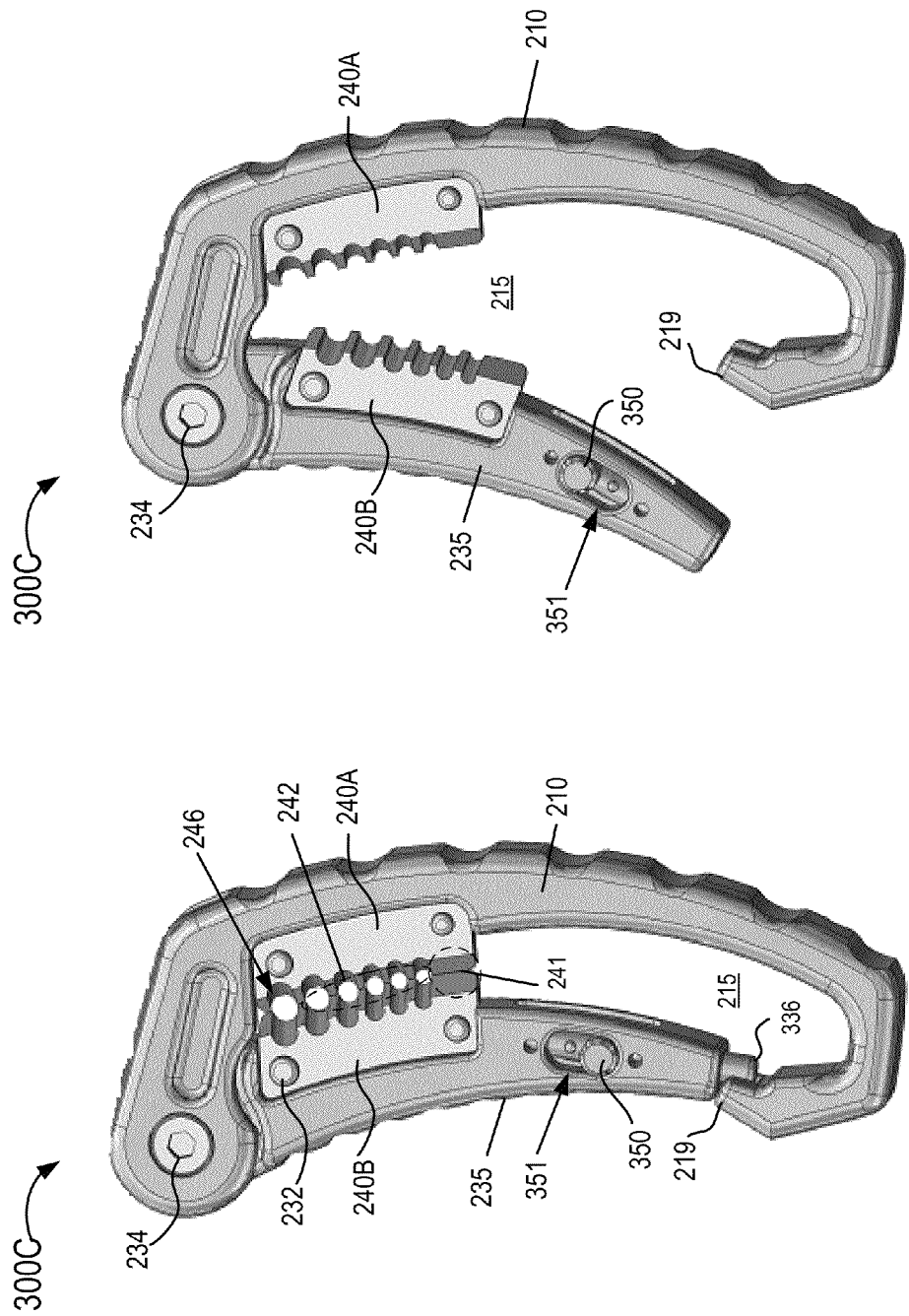

MULTI-TOOL APPARATUS

CROSS-REFERENCE TO RELATED APPLICATIONS

The present application claims the benefit under 35 U.S.C. §119(e) of U.S. Provisional Patent Application No. 61/537,958 to Thomas Richard Stokes, filed Sep. 22, 2011, the entire contents of which is hereby incorporated by reference herein.

BACKGROUND

1. Field

Example embodiments generally relate to a multi-tool apparatus.

2. Related Art

Tools with gate elements, such as carabiner clips, are known. The carabiner style clip system is widely known for its ease of use, functionality, and reliability. In its original and most common form, it is used as a safety device for climbing. The use of carabiner style clips has been extended and integrated into many consumer products for carrying tools, such as writing instruments, watches, dog leashes, and drink containers. These products have carabiner clips permanently fixed to the tool to permit the user to clip the tool to a belt loop or other surface when the tool is not being used.

SUMMARY

An example embodiment is directed to a multi-tool apparatus. The apparatus includes a frame having at least one opening and at least one gate element partially bounding the at least one opening. The at least one gate element is movable relative to the frame to permit access to the opening. The apparatus includes at least one cutting element partially bounding the at least one opening. The at least one gate element is movable into the opening so that the at least one gate element and at least one cutting element come into contact for wire stripping, crimping, and cutting operations.

Another example embodiment is directed to a multi-tool apparatus including a frame having at least one opening and at least one gate element partially bounding the at least one opening. The at least one gate element is movable relative to the frame to permit access to the opening. The apparatus includes at least one cutting element, the at least one gate element movable into the opening so that the at least one gate element and at least one cutting element come into contact. The at least one cutting element includes a flat-bladed cutting section for wire cutting operations and a plurality of semi-circular cutout sections for wire-stripping and crimping operations.

Another example embodiment is directed to a multi-tool apparatus including a frame having at least one opening and at least one gate element partially bounding the at least one opening, the at least one gate element movable relative to the frame to permit access to the opening. The apparatus includes at least one cutting element, the at least one gate element movable into the opening so that the at least one gate element and at least one cutting element come into contact. The apparatus includes a pair of opposed, pivotable, pliers heads, one each attached to the frame and to the at least one gate element respectively, the at least one gate element and frame serving as handles for the heads.

Another example embodiment is directed to a multi-tool apparatus including a frame having a pair of openings separated by a frame part, and at least one gate element partially bounding a respective one of the openings, the at least one gate element separately movable relative to the frame to permit access to its corresponding opening. The apparatus includes at least one cutting element, the at least one gate element movable into its corresponding opening so that it and the at least one cutting element come into contact.

Another example embodiment is directed to a multi-tool apparatus including a frame having an opening, the frame having a first end and a second end, and a single handle attached to the frame at a joint. The apparatus includes a pair of opposed, pivotable, pliers heads or cutting blade heads, one each attached to the frame first end and to the handle respectively and pivotable at the joint, and a tool attached at the frame second end.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 6 is a front perspective view of the apparatus of FIGS. 1-3 showing use of the bottle cap opening tool.

FIG. 9 is a top perspective view of the apparatus of FIG. 7 in a wire-stripping or crimping operation.

FIG. 10 is a top view of a multi-tool apparatus in a closed state according to another example embodiment.

FIG. 13 is a perspective view of a multi-tool apparatus in a closed state according to another example embodiment.

FIG. 14 is a perspective view of the apparatus of FIG. 13 in an open, operational state.

FIG. 15 is a perspective view of a multi-tool apparatus in a closed state according to another example embodiment.

FIG. 16 is a perspective view of the apparatus of FIG. 15 in an open, operational state.

DETAILED DESCRIPTION

As to be described in detail hereafter, the example embodiments are directed to a multi-tool apparatus that includes a frame and a pivotable gate element (one or more, depending on the configuration) attached to the frame that encloses at least one opening between and within the frame and gate. The gate element is movable relative to the frame to permit access into the opening. The apparatus includes at least one cutting element partially bounding the at least one opening, which may be on the frame, gate element or both. In one example, the gate element is movable into the opening so that it and the cutting element come into contact for operations such as wire stripping, crimping, and cutting operations. The apparatus includes a plurality of tools attached to and/or deployable therefrom for additional operations and also means to permit the user to clip the apparatus to a belt loop or other surface when the apparatus is not being used. This attachment means to an external article may or may not include the gate element which contacts the cutting element for various cutting and stripping operations.

Accordingly, the frame and gate element comprise enclosing structure for the opening; as such the shape of the frame and opening bounded therein may be arbitrary and are not limited in any way. With the gate positioned on the frame in a closed state, the enclosed opening bounded collectively by both frame and gate may be circular, ovular or otherwise prolapsed, triangular, four-sided, polygonal, etc. This provides for a frame shape that may be tailored as necessary for any desired opening dimension or shape.

As described hereafter, the gate element in one example may be pivotable and spring loaded, biased in the closed position. In another example, the gate element may be controlled by a latch/plunger or slide tab arrangement that is actuated to permit pivotable movement thereof into the opening and/or away from the opening within the frame, depending on the tool configuration of the apparatus.

Figure 1:
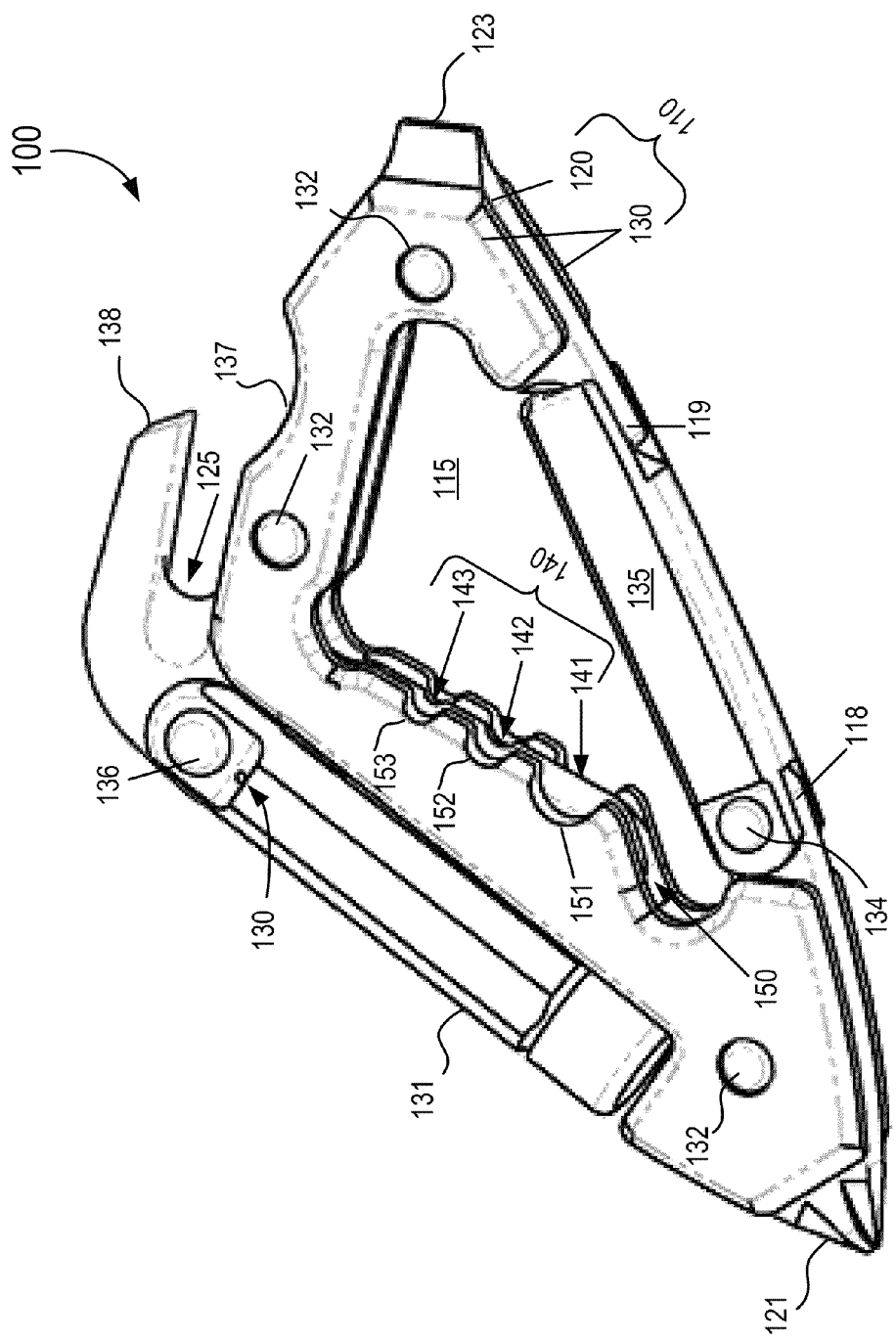
FIG. 1 is a perspective top view of a multi-tool apparatus according to an example embodiment.
Figure 2:
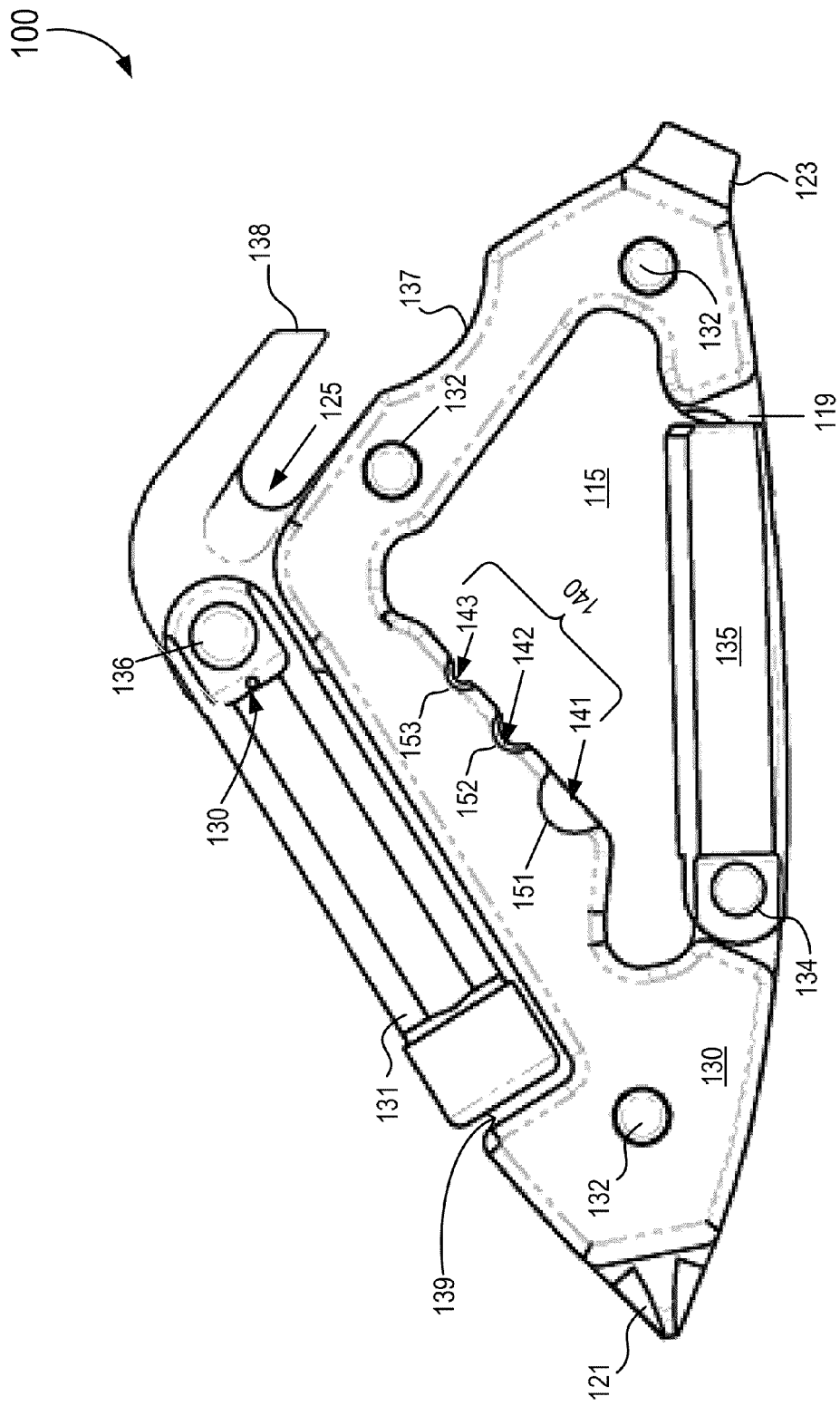
FIG. 2 is a top view of the apparatus of FIG. 1 in a closed state.
Figure 3:
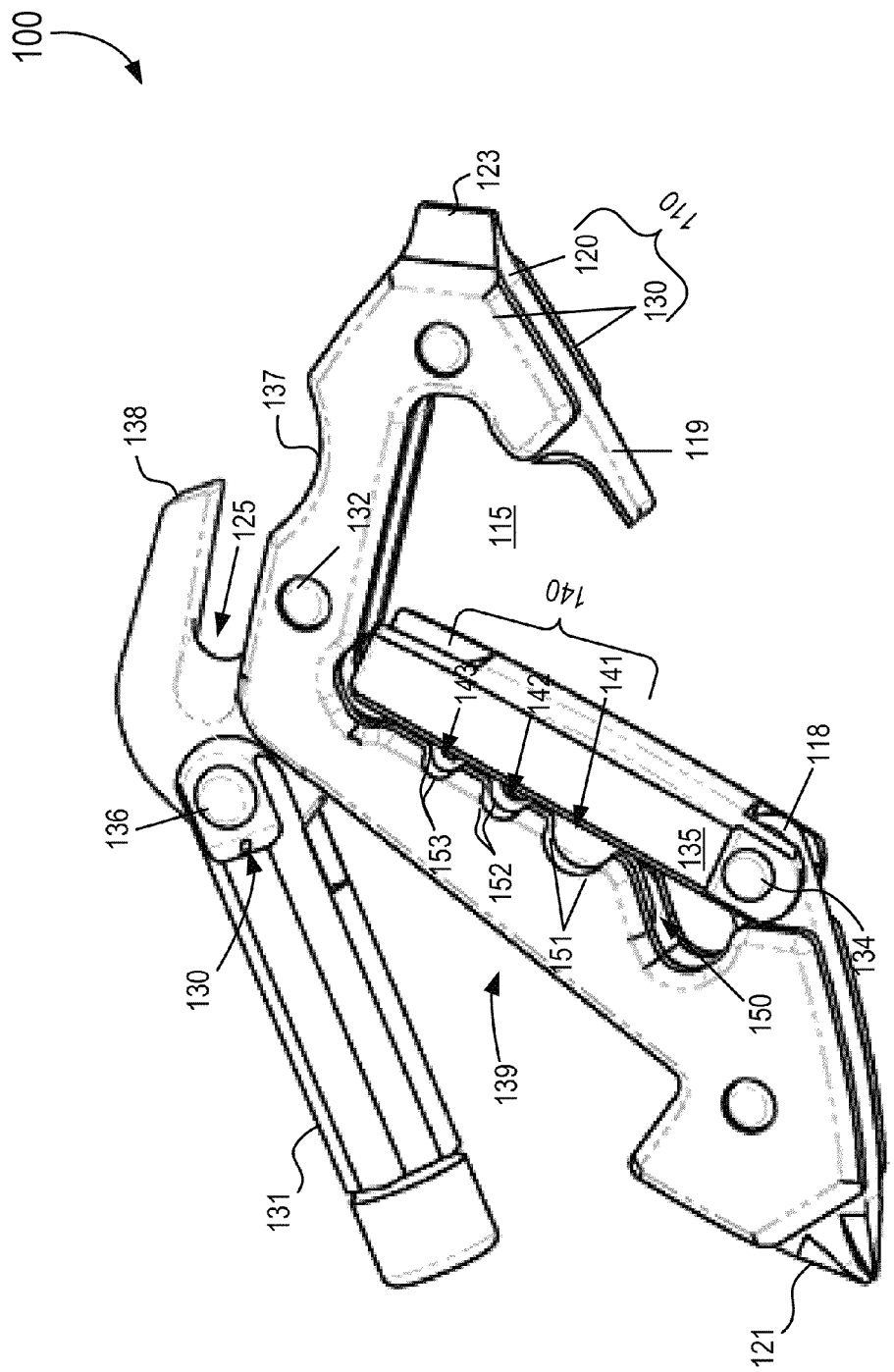
FIG. 3 is a perspective view of the apparatus of FIG. 1 in an open, operational state.

FIG. 1 is a perspective top view of a multi-tool apparatus according to an example embodiment; FIG. 2 a top view of the apparatus in a closed state; FIG. 3 a perspective view of the apparatus in an open, operational state; and FIG. 4 a top view of a tool accessory plate of the apparatus. Referring now to FIGS. 1-4, apparatus 100 includes frame 110 which is comprised of mating halves 130 sandwiching tool accessory plate 120. A latching gate element 135 is pivotally connected at a first end via pivot pin 134 at a foot 118 of plate 120, its opposite second end including a recess which engages foot 119 of plate 120 in the closed position so the gate element 135 partially bounds an opening 115. The gate element 135 here is pivotable via pivot pin 134, which extends through aligned holes in halves 130 (obscured) and an aperture 124 in plate 120, and is spring loaded, biased in the closed position.

Figure 4:
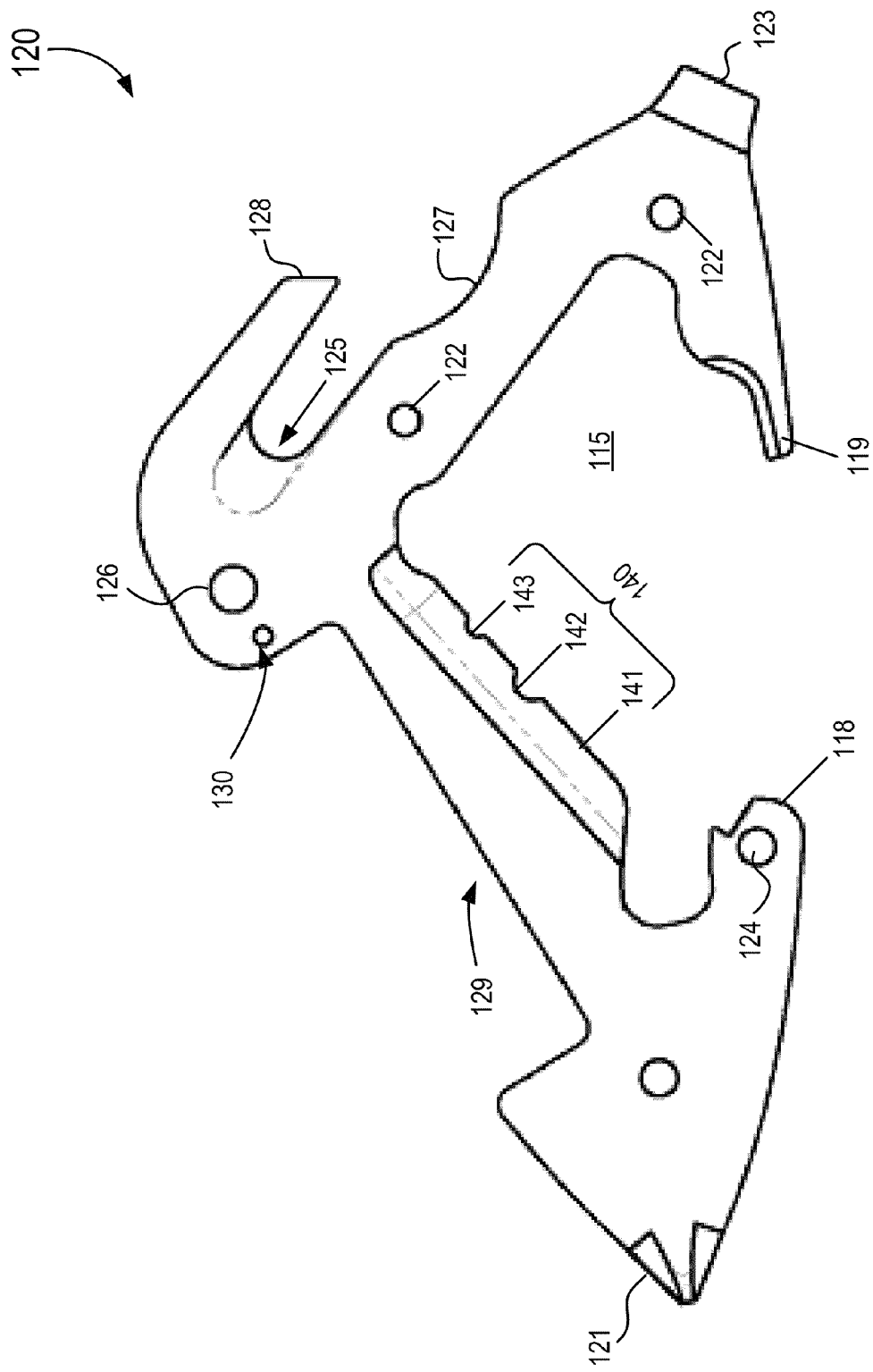
FIG. 4 is a top view of a tool accessory plate of the apparatus shown in FIGS. 1-3.

Apparatus 100 may include a plurality of tools on frame 100; namely, for example, a Phillips screwdriver head end 121, flat screwdriver head end 123 (each of which is formed as part of tool accessory plate 120 as shown best in FIG. 4), a web edge cutter tool 125, a bottle cap opener 137 (creating a lip with edge 127 of plate 120, see FIG. 4), a pry bar 138, and a pivotable light tool 131, which in a closed position resides in a storage slot 139 (formed in halves 139 with cutout 129 in plate 120). As best seen in FIGS. 3 and 4, light tool 131 is pivotable via pivot pin 136, which extends through aligned holes in halves 130 and aperture 126 in plate 120, and is spring loaded, biased in the closed position. A ball detent 130 pops into and out of a slot via interference fit fashion as the light tool 130 moves between the open and closed positions, so that it can be fixed at a desired position to direct light.

In an example, light tool 131 can include LED elements (not shown) connected to a battery source (not shown) contained within the body thereof. The LED elements may be activated by rotating a light activator switch, which in one example may be the head of the tool 131, which causes power to be supplied by the batteries to the LED elements. The batteries can be electrically connected to and can supply power to the LED elements in any conventional manner. The tool 131 can have a transparent cover covering the LED elements. In alternative embodiments, conventional incandescent bulbs can be used instead of LED elements. The number of LED elements can vary and, if desired, the LED elements can be operated (turned on) as a group and/or individually.

Although only a single tool (light tool 131) is shown in storage slot 139, it is evident to the skilled artisan that a plurality of tools could be provided in storage slot. Accordingly, a single tool in storage slot is shown for purposes of explanation only, it being understood that a plurality or different pivotable tools could be grouped within storage slot 139. Examples include, but are not limited to a knife blade, can opener, bottle cap opener, screwdriver, saw, file, Allen wrench, scissors, clipping tool, claw-shaped hook tool, pliers heads, ice pick, and combinations thereof.

In another alternative example, the storage slot 139 may be omitted and one or more tools may be pivotally stored via pivot pin 136 along the side of frame 110. Accordingly, in this configuration tools would fold out alongside or next to the longitudinal axis of the frame 110, instead of being deployed outward from within the storage slot 139. In a further alternative example, the pry bar 138 may be moved or removed from its location on frame 110 and the storage slot 139 can be configured in place, so that one or more tools may be recessed therein so as to slide out under spring action or upon actuation of a latch or release button. Any of the above example tools or combination thereof noted above may be stored within the storage slot 139, to be released and withdrawn by actuation of the release/latch that is provided on frame 110. This configuration further envisions an additional tool such as a box cutter. Moreover, one or more of the pivotable or slidable tools attached within the storage slot 139 may be replaceable should the tool wear out with use. Replaceable tool parts envision accessory sales for replacement parts for apparatus 100.

In this example, there is an additional tool on frame 110, formed in a recess 150 created between the halves 130, a cutting element 140. Each half 130 has a series of notches 151, 152, 153 formed therein which lineup; these are provided for to accommodate the insulation of varying diameter sheathed cable. As shown best in FIG. 4, tool accessory plate 120 has the cutting element 140 formed as a part thereof, with flat bladed portion serving as a cutting tool 141 for wire, cable, etc, and different-radius semi-circular cutouts 142, 143 (only two are shown by way of example), there could be greater than two) exposed in the recess 150 beneath the notches 151 through 153. Cutouts 142, 143 collectively comprise a wire-stripping tool of the cutting element 140, with the largest cutout 142 also being configured as a crimping tool for electrical wire/cable.

Referring to FIG. 2 and although not shown, but as an option, apparatus 100 may be configured with a protection cover for the cutting element 140. For example, a protective cover would cover the exposed parts of the wire stripping (142) and cutting tools (141) to protect the user's fingers when apparatus 100 is not in use. The cover could be composed of a rubber, plastic, or metallic material and may be removable, slidable, or pivoting. The cover would only be employed with the apparatus 100 in the closed or stowed (gate element 135 closed) position.

Figure 5:
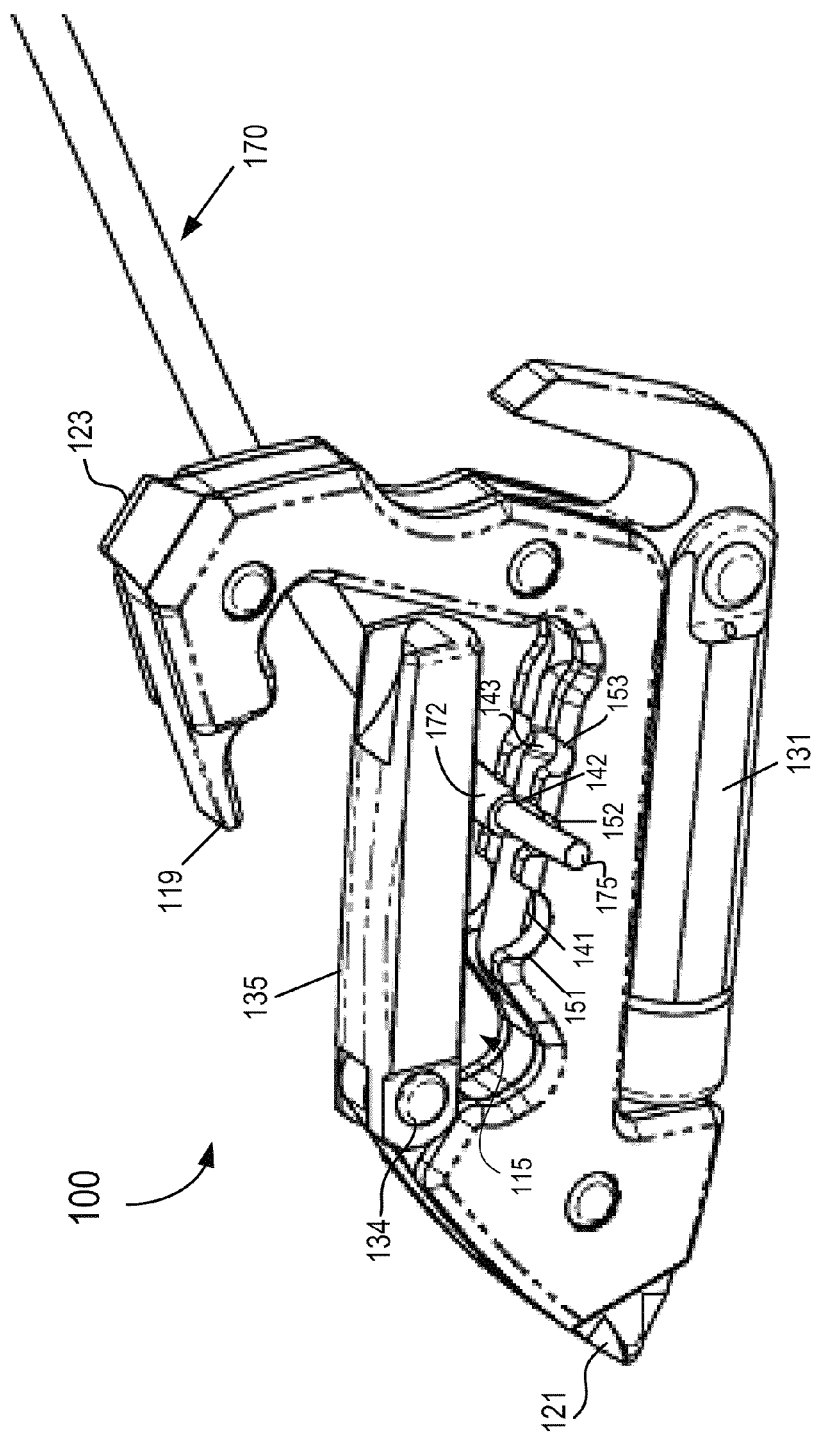
FIG. 5 is a side view of the apparatus of FIGS. 1-3 in a wire-stripping operation.

FIG. 5 is a side view of the apparatus of FIGS. 1-3 in a wire-stripping operation. Here, sheathed cable 170 is inserted into opening 115 so that it rests on notch 152, sized for this cable diameter. A user grips apparatus 100 and overcomes the spring pressure of pivot pin 134 to pivot gate element 135 into the opening, bringing it into contact with the cutting element 140. Specifically, the flat planar underside of the gate element 135 applies pressure against insulation 172 of cable 170 down on the cutout 142 of the wire stripping tool, cutting into the insulation 172 so as to expose bare wire 175, as shown.

Accordingly, apparatus 100 offers several additional tool functions or operations with cutting element 140. First, the apparatus 100 and more specifically the cutting element 140 provides for wire stripping tool operations to remove insulation from both solid and stranded wire of different American Wire Gauges (AWGs) without damaging the conductor. Secondly, crimping operations may be performed with apparatus 100, so as to connect insulated and non-insulated ring, fork and butt splice terminals to different AWGs, for example. Third, cutting operations may be performed by the apparatus 100 for cutting solid and stranded wire of different AWGs as well as NM (nonmetallic) sheathed cable.

The apparatus 100 heretofore shown may be attached to a key chain, a belt loop, a back pack, a work belt or clip, or other external article for example, via gate element 135. Although the example embodiments are not limited to overall profile size of the apparatus 100, one example dimensional profile of the apparatus 100 is a maximum length of about 3", to facilitate placing it into one's pocket with keys.

FIG. 6 is a front perspective view of the apparatus of FIGS. 1-3 showing use of the bottle cap opening tool. In FIG. 6, a bottle cap 180 underside is wedged between the pry bar 138 and the bottle cap opener (formed by ramp cutouts 137 and 127). The leveraging of the cap 180 by the pry bar 138 with top surface of the cap 180 up against opener 137 allows ease of removal, as is known.

Referring to FIG. 1, a series of fasteners 132 (screws, rivets, etc.) bind the accessory plate 120 and halves 130 together to form an integral apparatus 100. Apparatus 100 may be composed of a material that will not become damaged with normal use and will maintain precision, shape and finish. For example, the tool accessory plate 120 (inclusive of all tool components thereon) may be composed of a high quality metal such as high-carbon, high-chrome alloy steel, hardened tool steel or stainless steel, etc. and a protective corrosion-resistant black oxide surface finish. However, other materials can be utilized to compose tool accessory plate 120 and are considered within the example embodiments, including materials having characteristics of high hardness, strength and durability as well as rust and wear-resistance. In an example, the tool accessory plate 120 is composed of a material that is harder than the hardest materials any tool thereon is designed to manipulate.

The halves 130, light tool 131 and gate 135 may be composed of anodized aluminum, a glass filled nylon such as Zytel®, or from high impact plastic, such as Acrylonitrile Butadiene Styrene (ABS), which is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high-strength polycarbonates such as GE Lexan®, or blended plastics. Further, one or more of the halves 130, light tool 131 and gate 135 may have an overmold material applied thereon composed of a thermoplastic elastomer, rubber or like material, with or without UV inhibitors, combinations of these materials, etc.

In fabricating the apparatus 100, the process thereof begins with creating a product design in software for a mold. As known, any computer-aided design (CAD) software design may be used to create the product design from which the one or more molded for the constituent parts (halves, plates, gate, etc.) is to be formed. Software examples include SOLIDWORKS® and AUTOCAD®. Creating the product design involves developing a number of specific design features in software from which machining centers create the mold; design of which may be done by the designer in no particular order. For apparatus 100, this may include forming the halves, forming the accessory plate, forming the gate element(s), and forming the cutting element(s).

Once the product designs are create, molds are made. Different manufacturing processes may be used to create the finished products from the molds. Example processes may include an injection molded process with metallic inserts added, a stamped metal parts process, a machining process for a metal-based product, and the forging and molding of metal parts, plus combinations of one or more of these processes for finish products which may or may not have combinations of metal and plastic components.

Figures 7, 8:
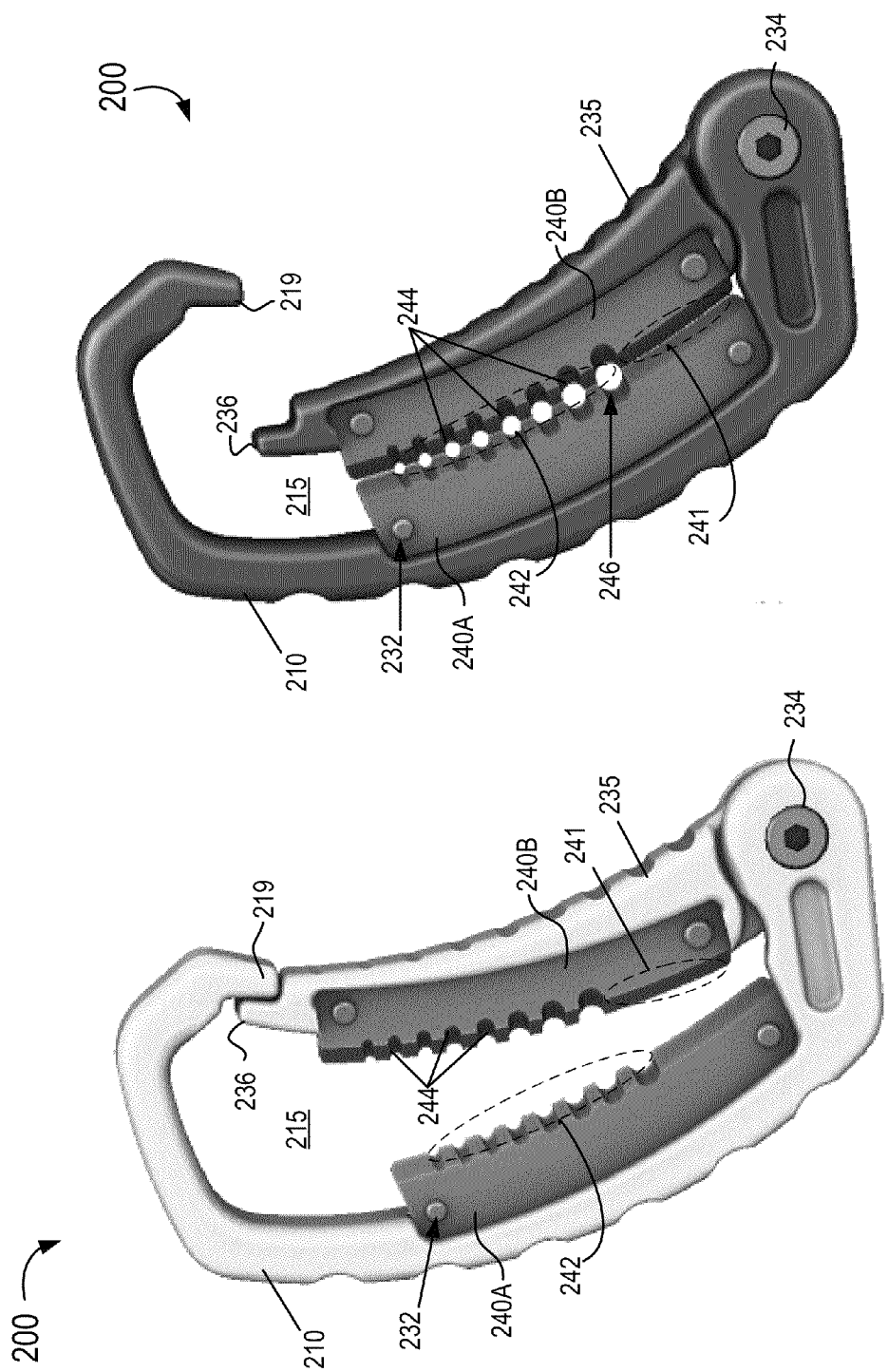
FIG. 7 is a top view of a multi-tool apparatus in a closed state according to another example embodiment.
FIG. 8 is a top view of the apparatus of FIG. 7 in an open, operational state.

FIG. 7 is a top view of a multi-tool apparatus in a closed state according to another example embodiment; FIG. 8 is in an open, operational state; and FIG. 9 is a top perspective view in a wire-stripping or crimping operation. Referring to FIGS. 7-9, apparatus 200 includes and elongated frame 200 and a gate element 235 each bounding an opening 215. Similar to the previous embodiment, gate element 235 is pivotable via pivot pin 234 and is spring loaded, biased in the closed position. However, here any outward movement is prevented by a lip and catch arrangement between the frame 210 and gate element 235, where in a closed or storage state, lip 236 engages a terminal end of frame 210, serving as a catch 219.

Apparatus 200 has multiple tools, shown here having a pair of cutting elements 240A, 240B which interact upon contact of the gate element 235 with frame 210. Each cutting element 240A, 240B has a series of varied radius half-moon cutouts 244. When these cutout-outs meet, a wire stripping tool 242 is presented (shown by dotted line oval). The largest aperture may serve as a crimping tool 246 in this embodiment. Each cutting element 240A, 240B further has a flat-bladed portion serving as a cutting tool 241 (dotted line circle). In FIG. 9, the insulation 172 of cable 170 is being stripped by stripping tool 242 to expose bare wire 175. Once this operation is complete, the gate element 235 is released, snapping back such that lip 236 rests against catch 219.

Similar to as described in the closed state for the apparatus 100 in FIG. 2, apparatus 200 may also be configured with one or more protection covers for the cutting elements 240A, 240B. For example, a protective cover would cover the exposed parts of the wire stripping (242), crimping (246) and cutting tools (241) to protect the user's fingers when apparatus 200 is not in use. The cover(s) could be composed of a rubber, plastic, or metallic material and may be removable, slidable, or pivoting. The cover(s) would only be employed with the apparatus 100 in the closed or stowed (gate element 235 closed) position.

Apparatus 200 heretofore shown may be attached to a key chain, a belt loop, a back pack, an electrician's work belt or clip, for example, via gate element 135. Although the example embodiments are not limited to overall profile size, one example dimensional profile of the apparatus 100 is an approximate length of about 6", to facilitate grasping around the frame 210 with the full four fingers and pressing the gate element 235 in with the thumb to engage the cutting elements 240A, 240B.

Apparatus 200 may be composed of materials similar to those described for apparatus 100. The main components of Apparatus 200 may be formed using molds created after CAD by a number of different processes, including but not limited to an injection molded process with metallic inserts added, a stamped metal parts process, a machining process for a metal-based product, and the forging and molding of metal parts, plus combinations of one or more of these processes for finish products which may or may not have combinations of metal and plastic components.

FIG. 10 is a top view of a multi-tool apparatus in a closed state according to another example embodiment. As FIG. 10 is similar to FIGS. 7-9, only the differences are noted. In FIG. 10, in apparatus 200' there is included a storage slot 239, somewhat similar to that shown in FIGS. 1-6 for apparatus 100. The storage slot 239 includes a plurality of pivot tool which have a proximal end secured within the slot 239 via a pivot pin 260. For exemplary purposes only, a knife blade 231, file 233 and saw 237 are show extended outward from storage slot 239. But a plurality or different, additional pivotable tools could be grouped within storage slot 139 including, but are not limited to a can opener, bottle cap opener, screwdriver, Allen wrench, scissors, clipping tool, claw-shaped hook tool, pliers heads, ice pick, and combinations thereof.

As discussed with apparatus 100, in apparatus 200', another variation foresees where the storage slot 139 may be omitted and one or more tools may be pivotally stored via pivot pin 260 along the side of frame 210. Accordingly, in this configuration tools would fold out alongside or next to the longitudinal axis of the frame 210, instead of being deployed outward from within the storage slot 239. In a further alternative example, the storage slot 239 can be configured at the top or bottom corner of frame 210 opposite that of gate element 235, so that one or more tools may be recessed therein within frame 210 so as to slide out under spring action or upon actuation of a latch or release button. Any of the above example tools or combination thereof noted above may be stored within the storage slot 239, to be released and withdrawn by actuation of the release/latch that is provided on frame 210. This configuration further envisions an additional tool such as a box cutter. Moreover, one or more of the pivotable or slidable tools attached within the storage slot 239 may be replaceable should the tool wear out with use. Replaceable tool parts envision accessory sales for replacement parts for apparatus 200.

Figure 12:
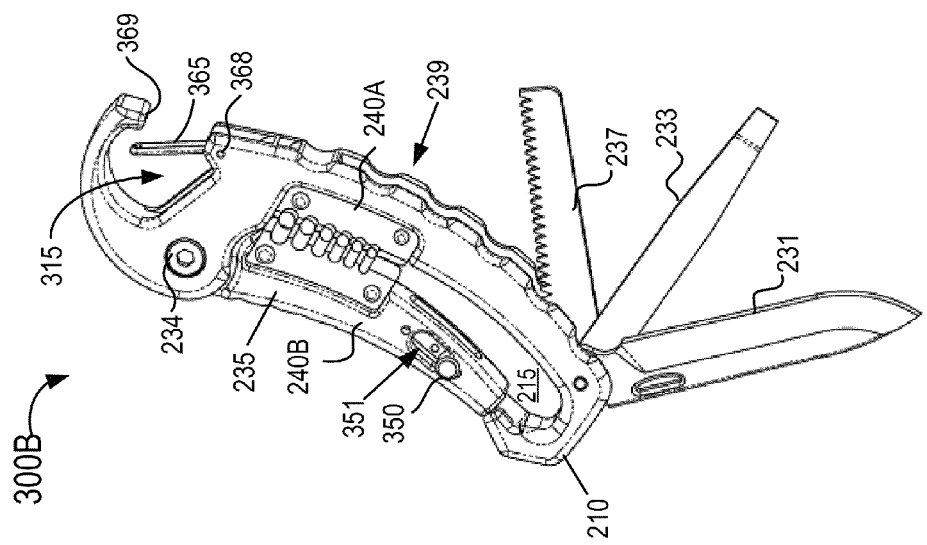
FIG. 12 is a top, perspective view of a multi-tool apparatus according to another example embodiment with selected tools deployed therefrom.
Figure 11:
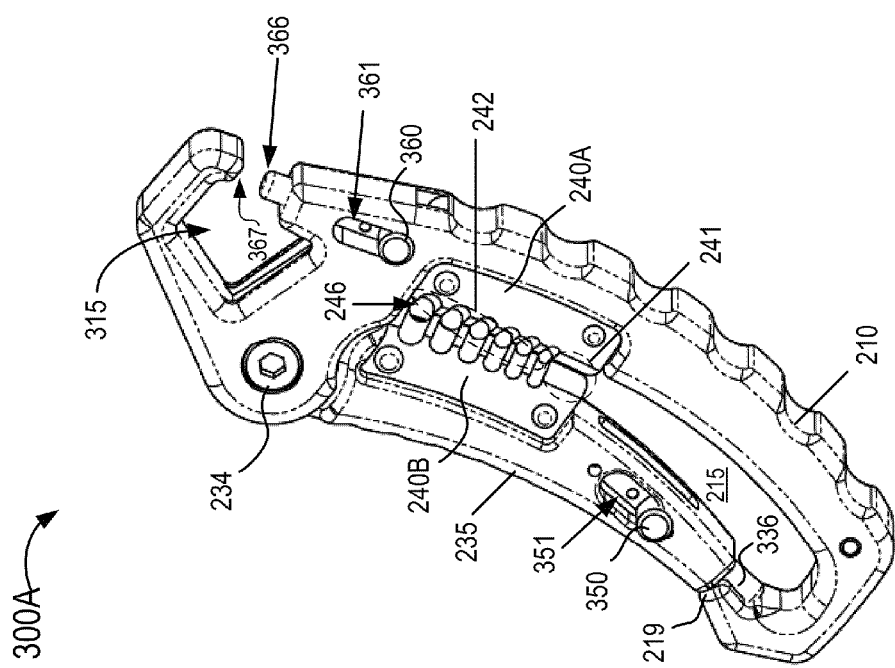
FIG. 11 is a top, perspective view of a multi-tool apparatus according to another example embodiment.

FIGS. 11 and 12 are top, perspective views of a multi-tool apparatus according to two other example embodiments. These two embodiments re directed to a multiple opening apparatus with a pair of gate elements.

In FIG. 11, there is shown apparatus 300A which has a gate element 235 and lower frame 210 similar to apparatus 200, accordingly, only the differences is noted hereafter. Frame 210 has a slide or latch 350 which rides in a restricted channel 351 and controls a plunger end 336 that abuts catch 219 in a closed position, with the gate element partially bounding opening 215. As a user moves latch 350 along channel 351 toward the channel elements 240A/B, the plunger 336 is withdrawn into the gate element 235 to allow free movement of the gate element 235 in its open position, performing one or more operations as a cutting tool, wire stripping or crimping tool, as previously described.

The upper end of apparatus 300A includes a second latch 360 riding in channel 361 which controls its own plunger 366. The plunger 366 serves as a gate and in a closed position serve to partially bind a second opening 315. The upper end of frame 210 terminates as a foot 367 that engages the plunger 366 when the latch 360 has been repositioned in channel 361 opposite from the position shown in FIG. 11.

FIG. 12 is similar to FIG. 11 regarding the latch 350 operation for gate 235 of apparatus 300B, but apparatus 300B has a wire gate 365 attached at a lower end to the frame 310 via hole 368 and which is spring loaded to be biased in the outward direction (or biased to close the gate 365 against catch 369 at the upper end of frame 210) so as to form a gate partially bounding a second opening 315. In both cases, each apparatus 300A, 300B includes two gate elements partially bounding respective corresponding openings. Either gate may be used for connecting its respective apparatus 300A/B to an external article.

Apparatus 300B of FIG. 12 further includes the storage slot 239 as shown previously in FIG. 10, with example pivotable tools such as the knife blade 231, file 233 and saw 237. Of course, the example embodiment is no so limited to these specific tools, as described above; combinations of other tools are contemplated.

FIG. 13 is a perspective view of a multi-tool apparatus in a closed state according to another example embodiment, with FIG. 14 showing an open, operational state. FIGS. 13 and 14 are similar to apparatus 200 in FIGS. 7 and 8; only the differences are noted. Here, instead of having the cutting element 240 on the frame 210, the cutting element 240 is provided on the inside surface of the gate element 245. Thus, in the open state when the user actuates the gate element 235 via pivot pin 234 so that lip 236 is separated from catch 219 toward opening 215, and brings it to bear against the flat surface of the frame 210, various cutting, wire stripping and/or crimping operations for sheathed cable may be performed.

FIG. 15 is a perspective view of a multi-tool apparatus in a closed state according to another example embodiment, with FIG. 16 showing the open, operational state. FIGS. 15 and 16 are similar to FIGS. 11 and 12, only the differences are noted. FIGS. 15 and 16 show a single gate, single opening configuration with latch 350. The operation is the same as described in FIGS. 11 and 12, with the cutting tools and operations possible therefrom the same as previously described first with respect to FIGS. 7 and 8.

Figure 18:
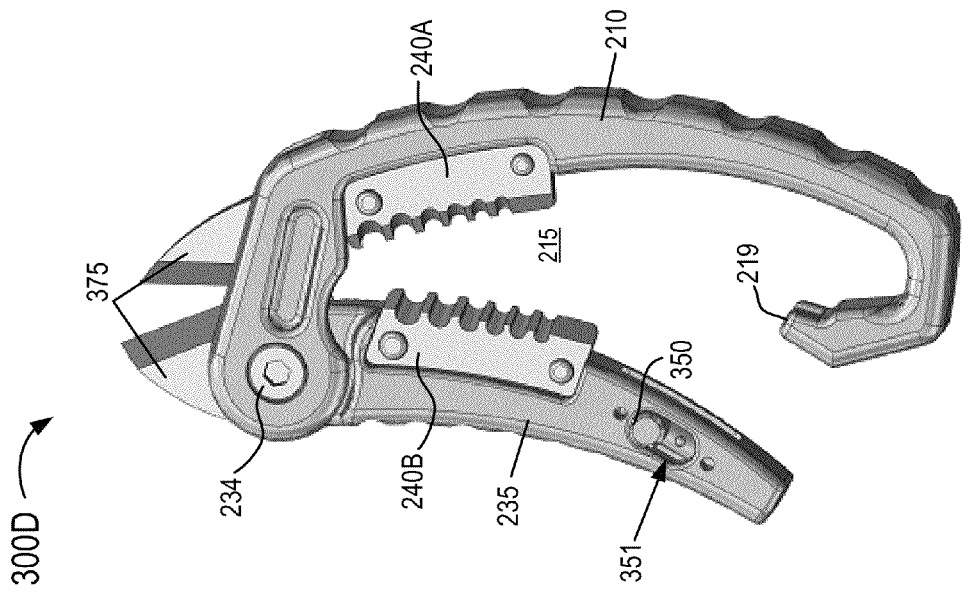
FIG. 18 is a perspective view of the apparatus of FIG. 17 in an open, operational state.
Figure 17:
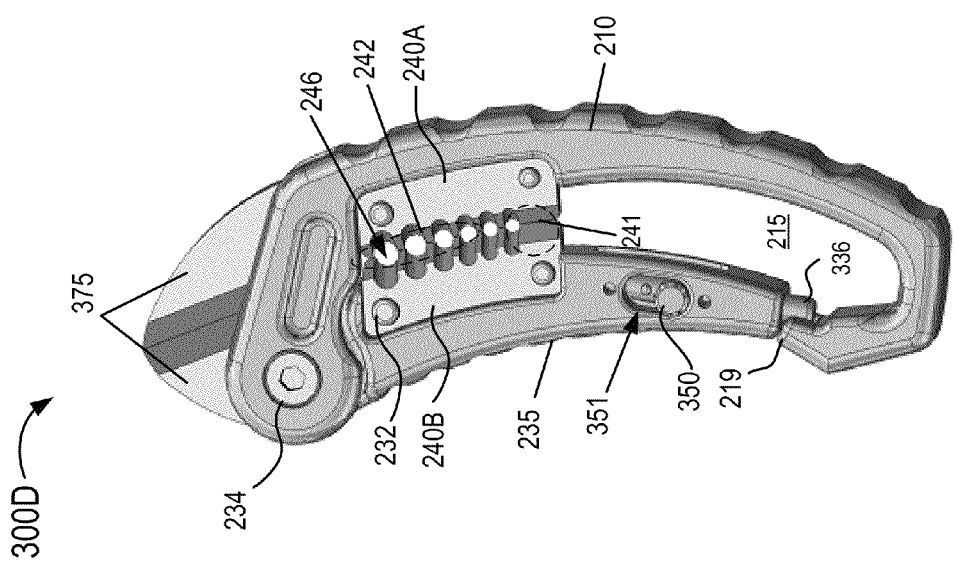
FIG. 17 is a perspective view of a multi-tool apparatus in a closed state according to another example embodiment.

FIG. 17 is a perspective view of a multi-tool apparatus in a closed state according to another example embodiment, with FIG. 18 a perspective view showing the open, operational state. FIGS. 17 and 18 is a slight variation of FIGS. 15 and 16 and includes an additional tool; a pair of opposed, pivotable, cutter blade heads 375 external from the opening 215 that is partially bounded by both frame 210 and gate element 235. Each cutter blade head 375 is respectively attached to the frame 210 and to the gate element 235 respectively. Accordingly, the gate element 235 and frame 210 serve as handles for the heads 375.

Figure 19:
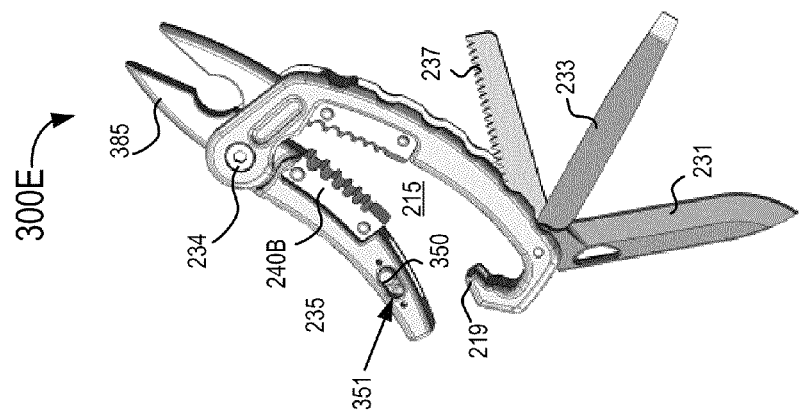
FIG. 19 is a perspective view of a multi-tool apparatus according to another example embodiment.

FIG. 19 is a perspective view of a multi-tool apparatus according to another example embodiment. FIG. 19 is similar to several of the previous embodiments, incorporating the dual cutting element structure first disclosed in FIGS. 7 and 8, the latch 350 first described in FIGS. 11 and 12, and the use of gate element and frame for external pivotable tooling as first shown in FIGS. 17 and 18. In FIG. 19, the cutter blade heads 375 have been replaced with pivotable pliers' heads 385, which may be standard or needle nose pliers head configurations. In apparatus 300E, each plier's head 385 is respectively attached to the frame 210 and to the gate element 235 respectively. Accordingly, the gate element 235 and frame 210 serve as handles for the heads 385.

Figure 21:
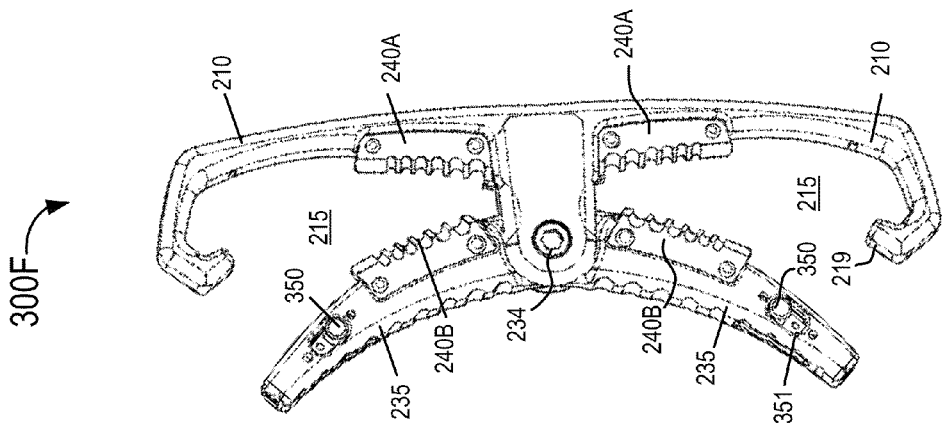
FIG. 21 is a perspective view of the apparatus of FIG. 20 in an open, operational state.
Figure 20:
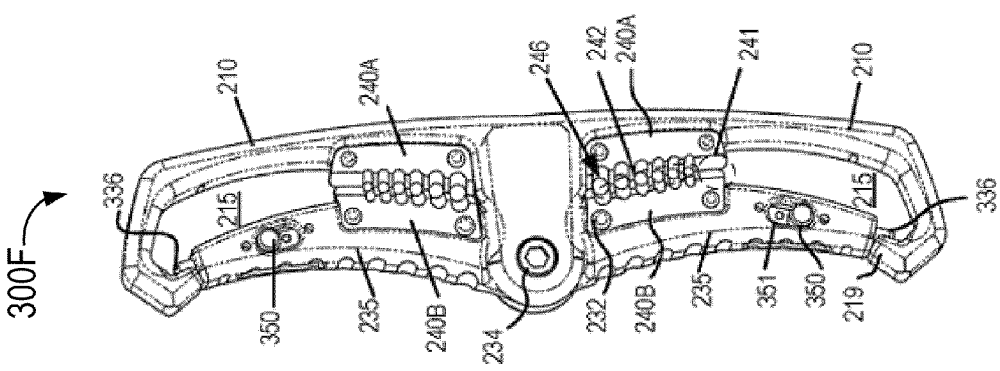
FIG. 20 is a perspective view of a multi-tool apparatus in a closed state according to another example embodiment.

FIG. 20 is a perspective view of a multi-tool apparatus in a closed state according to another example embodiment, with FIG. 21 a perspective view showing the open, operational state. As many of the previous embodiments shown the frame, gate element and cutting element structure, only the differences are noted. FIGS. 20 and 21 are provided to describe a double-opening, double-gate, double-cutting element apparatus 300F.

Figure 22:
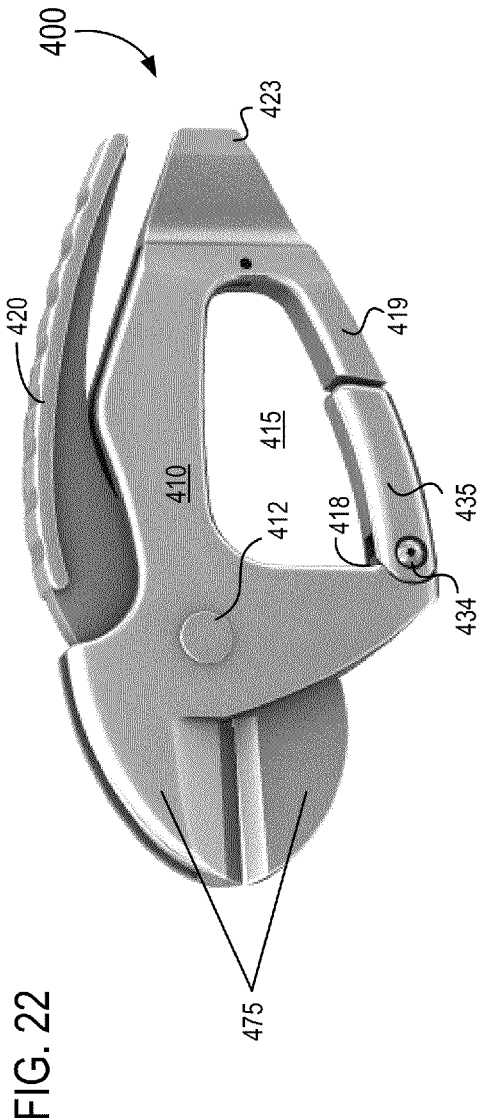
FIG. 22 is a top view of a multi-tool apparatus in a closed state according to another example embodiment.
Figure 23:
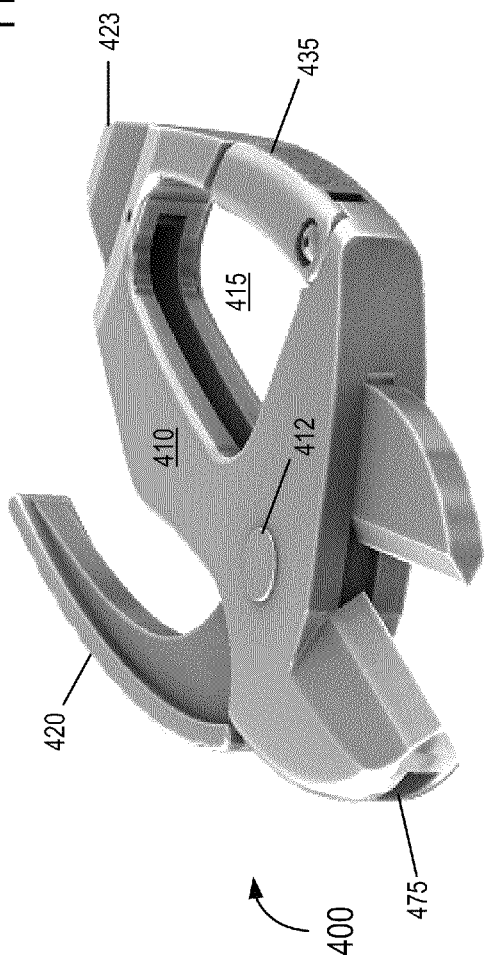
FIG. 23 is a front perspective view of the apparatus of FIG. 22 in an open, operational state.

FIG. 22 is a top view of a multi-tool apparatus in a closed state according to another example embodiment, with FIG. 23 showing a front perspective view in an open, operational state. Referring to FIGS. 22 and 23, apparatus 400 includes a frame 410 with a pivotable gate connected between feet 418, 419 of the frame 410, by way of pivot pin 434. As with gate elements 135 and 235, gate element 435 is spring loaded, biased in the closed position via pivot pin 434.

Apparatus 400 includes a first tool, shown as a flat end screwdriver head 423, attached to frame 410. However, this could be a bit holder mechanism that may be configured to hold any variation of desired tool accessory bits, including but not limited to flat screwdriver bits, Phillips screwdriver bits, Allen wrench bits, socket bits, wrench bits, etc., and combinations thereof. Apparatus 400 includes a second tool, a pair of cutter blade heads of a cutter or shearer, which could alternately be heads of pliers. A dedicated handle 420 serves as one handle for on head 475, with the frame serving as a handle for the other head 475. The heads 475 pivot about joint 412 as is known.

Figure 25:
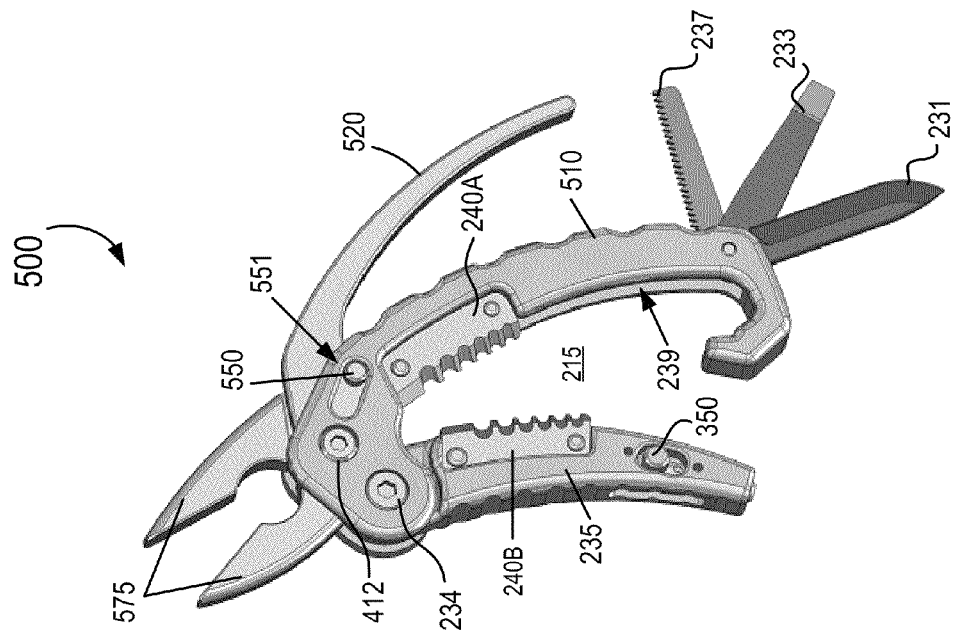
FIG. 25 is a perspective view of the apparatus of FIG. 24 in an open, operational state.
Figure 24:
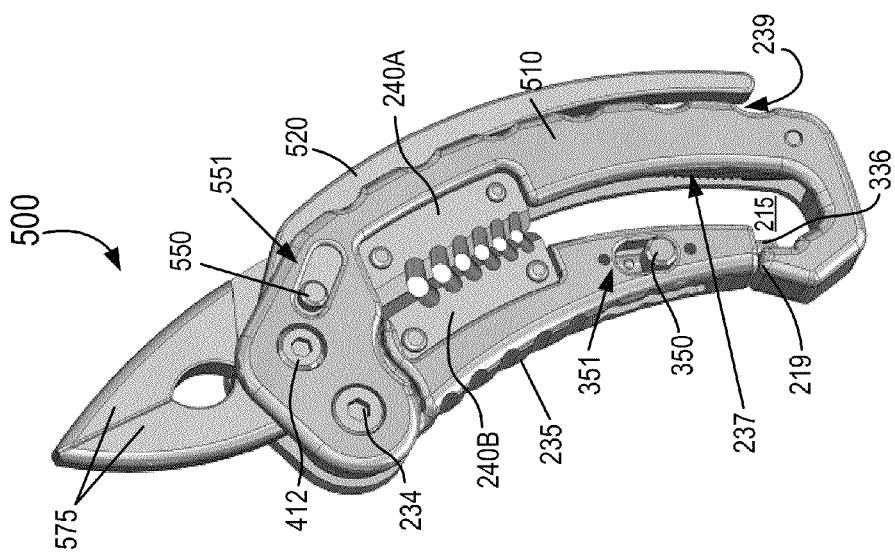
FIG. 24 is a perspective view of a multi-tool apparatus in a closed state according to another example embodiment.

FIG. 24 is a perspective view of a multi-tool apparatus in a closed state according to another example embodiment, with FIG. 25 a perspective view showing the open, operational state. FIGS. 24 and 25 illustrate an apparatus 500 that is a variation of the dedicated handle concept of apparatus 400 in FIG. 23. Apparatus 500 employs the gate element 235, cutting element 240A, 240B and basic frame 210 as first outlined in FIGS. 7 and 8, with the latch 350 of FIGS. 11 and 12.

Apparatus 500 also employs the dedicated handle 520 similar to that shown in FIG. 23 as an actuator for one of the pliers' heads 575. However, apparatus 500 employs a secondary latch 550 which rides in channel 551 which locks and unlocks the pliers heads 575 and permits actuation thereof. FIG. 24 shows the locked position for both gate element 235 and pliers heads 575; FIG. 25 shows the unlocked position, with the dedicated handle 520 and in this embodiment the gate element 235 serving as the other handle, pivoting the pliers heads 575 about joint 412.

Figure 26:
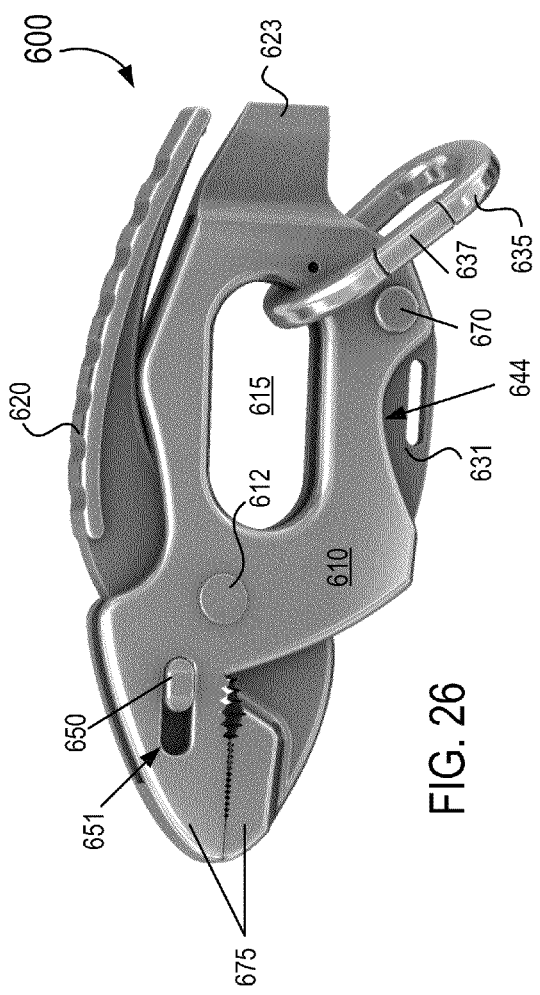
FIG. 26 is a top perspective view of a multi-tool apparatus in a closed state according to another example embodiment.
Figure 28:
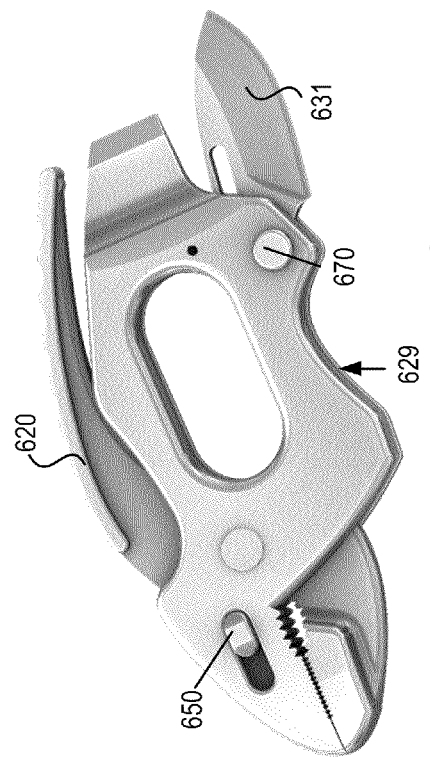
FIG. 28 is a top perspective view of the apparatus of FIG. 26 with a tool deployed.
Figure 27:
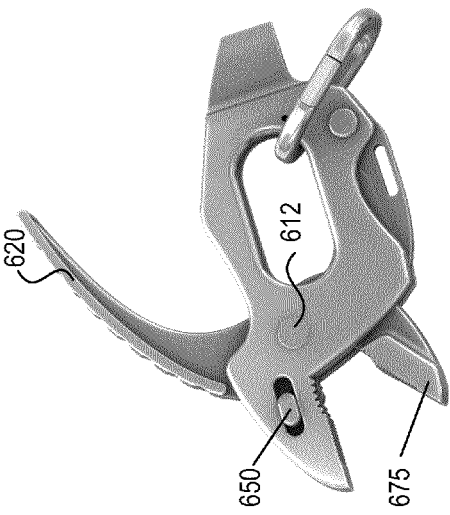
FIG. 27 is a top perspective view of the apparatus of FIG. 26 with a tool deployed.

FIG. 26 is a top perspective view of a multi-tool apparatus in a closed state according to another example embodiment, with FIGS. 27 and 28 showing various tools deployed. FIGS. 26-28 describe a gate-less apparatus 600 with a dedicated handle and multiple tools. Frame 610 includes a latch 650 riding in a restricted channel 651 which permits operation of a set of pliers heads 675 between a closed an open position, the operation of which has been previously described. A dedicated handle 620 and the frame 610 serve to pivotally open and close (operate) the pliers heads 675 when the latch 650 has been slid into the open position (see FIG. 27).

A clip 635 with gate 637 is attached to frame 610 for attachment thereof to an external article. Apparatus 600 includes a flat end screwdriver head 623, attached to frame 610; this could be a bit holder mechanism that may be configured to hold any variation of desired tool accessory bits. The lower end of frame has a ridge cutout 644 to facilitate access to a pivotable knife blade 631, which may be accessed and flipped out for use. The knife blade locks into position and can be stowed back within its storage slot by pressing release 670, as is known.

The example embodiments being thus described, it will be obvious that the same may be varied in many ways. Such variations are not to be regarded as departure from the example embodiments, and all such modifications as would be obvious to one skilled in the art are intended to be included in the following claims.

What is claimed:

1. A multi-tool apparatus, comprising:
   a frame having at least one opening and at least one gate element partially bounding the at least one opening, the at least one gate element movable relative to the frame to permit access to the opening, and
   at least one cutting element partially bounding the at least one opening, the at least one gate element movable into the opening so that the at least one gate element and at least one cutting element come into contact for wire stripping, crimping, and cutting operations,
   wherein the at least one cutting element is on the at least one gate element and faces the frame across the opening.

2. The apparatus of claim 1, wherein the at least one cutting element is on the frame and faces the at least one gate element across the opening.

3. The apparatus of claim 1, further comprising:
   two cutting elements in facing relation to one another across the at least one opening, a first cutting element on the frame and a second cutting element on the at least one gate element.

4. The apparatus of claim 1, further comprising:
   a pair of gate elements, each including a cutting element thereon.

5. The apparatus of claim 1, wherein the at least one gate element includes a latch moveable between a locked and unlocked position to secure and release the at least one gate element from the frame so that it is pivotable toward or away from the at least one opening.

6. The apparatus of claim 1, wherein the frame includes an elongated storage slot disposed therein.

7. The apparatus of claim 6, further comprising:
   at least one tool pivotally mounted at one end thereof in the storage slot and extendable between an open position external from the storage slot and a closed position within the storage slot.

8. The apparatus of claim 7, wherein the at least one tool is selected from a group comprising a knife blade, can opener, bottle cap opener, screwdriver, saw, file, Allen wrench, scissors, clipping tool, claw-shaped hook tool, pliers heads, ice pick, and combinations thereof.

9. The apparatus of claim 1, wherein the frame further includes:

a pair of housing halves, and a central metal tool accessory plate sandwiched between the housing halves and secured by a plurality of fasteners therethrough to the halves to form the frame, the metal accessory plate having a pair of distal lower ends, one end on either side of the at least one gate element, one end terminating as a Phillips screwdriver head end, the other terminating as a flat screwdriver head end respectively, an upper end of the tool accessory plate having a cutting edge formed therein, and an external edge thereof having a bottle cap opener formed therein.

10. The apparatus of claim 1, wherein the at least one cutting element further includes:

a metal flat-bladed cutting section for wire cutting operations, and a plurality of semi-circular cutout sections adjacent the flat-bladed cutting section for wire-stripping and crimping operations.

11. The apparatus of claim 1, further comprising:

a pair of opposed, pivotable pliers heads, one each attached to the frame and to the at least one gate element respectively, the at least one gate element and frame serving as pliers handles for the heads.

12. A multi-tool apparatus, comprising:

a frame having at least one opening and at least one gate element partially bounding the at least one opening, the at least one gate element movable relative to the frame to permit access to the opening, and at least one cutting element, the at least one gate element movable into the opening so that the at least one gate element and at least one cutting element come into contact, the at least one cutting element including a flat-bladed cutting section for wire cutting operations and a plurality of semi-circular cutout sections for wire-stripping and crimping operations.

13. The apparatus of claim 12, further comprising:

an elongated storage slot disposed within the frame, and at least one tool pivotally mounted at one end thereof in the storage slot and extendable between an open position external from the storage slot and a closed position within the storage slot.

14. The apparatus of claim 12, wherein the at least one gate element includes a latch moveable between a locked and unlocked position to secure and release the at least one gate element from the frame so that it is pivotable toward or away from the at least one opening.

15. The apparatus of claim 12, further comprising:

two cutting elements in facing relation to one another across the at least one opening, a first cutting element on the frame and a second cutting element on the at least one gate element.

16. A multi-tool apparatus, comprising:

a frame having at least one opening and at least one gate element partially bounding the at least one opening, the at least one gate element movable relative to the frame to permit access to the opening, at least one cutting element, the at least one gate element movable into the opening so the at least one gate element and at least one cutting element come into contact, and a pair of opposed, pivotable, pliers heads, one each attached to the frame and to the at least one gate element respectively, the at least one gate element and frame serving as handles for the heads.

17. The apparatus of claim 16, wherein the at least one cutting element includes a flat-bladed cutting section for wire cutting operations and a plurality of semi-circular cutout sections for wire-stripping and crimping operations.

18. The apparatus of claim 16, further comprising:

two cutting elements in facing relation to one another across the at least one opening, a first cutting element on the frame and a second cutting element on the at least one gate element.

19. A multi-tool apparatus, comprising:

a frame having a pair of openings separated by a frame part, at least one gate element partially bounding a respective one of the openings, the at least one gate element separately movable relative to the frame to permit access to its corresponding opening, at least one cutting element, the at least one gate element movable into its corresponding opening so that it and the at least one cutting element come into contact, and a clip with gate removably attached to the frame.

20. A multi-tool apparatus, comprising:

a frame having an opening, the frame having a first end and second end, a single handle attached to the frame at a joint, a pair of opposed, pivotable, pliers heads or cutting blade heads, one each attached to the frame first end and to the handle respectively and pivotable at the joint, a tool attached at the frame second end, a gate element partially bounding the opening, the gate element movable relative to the frame to permit access to the opening, and at least one cutting element, the at least one gate element movable into the opening so that the at least one gate element and at least one cutting element conic into contact.

21. The apparatus of claim 20, further comprising:

a latch moveable between a locked and unlocked position to secure and release the pliers or cutting blade heads.

22. The apparatus of claim 20 further comprising:

a clip with gate removably attached to the frame.

23. The apparatus of claim 20, wherein the tool attached to the second end is one of a screwdriver bit end and a bit holder for tool accessory bits.

24. The apparatus of claim 20, further comprising:

a storage slot in the frame with a knife blade deployable therefrom.

* * * * *